(12) United States Patent
Shen

(10) Patent No.: US 7,046,871 B2
(45) Date of Patent: May 16, 2006

(54) OPTOELECTRONIC TRANSMISSION MODULE AND FABRICATION METHOD THEREOF

(75) Inventor: Li-Cheng Shen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 233 days.

(21) Appl. No.: 10/847,192

(22) Filed: May 17, 2004

(65) Prior Publication Data
US 2005/0169639 A1  Aug. 4, 2005

(30) Foreign Application Priority Data
Jan. 30, 2004  (TW) ............... 93102115 A

(51) Int. Cl.
G02B 6/12 (2006.01)
G02B 6/36 (2006.01)
H04B 10/00 (2006.01)

(52) U.S. Cl. ............... 385/14; 385/88; 385/89; 385/90; 385/91; 385/92; 385/130; 385/114; 398/164; 398/141; 398/156

(58) Field of Classification Search ......... 385/88–92, 385/114, 130; 398/141, 164, 156
See application file for complete search history.

(56) References Cited

U.S. PATENT DOCUMENTS 6,172,783 B1 * 1/2001 Funada et al. ............ 398/164

* cited by examiner

Primary Examiner—Frank G. Font
Assistant Examiner—Michael P. Mooney
(74) Attorney, Agent, or Firm—Thomas, Kayden, Horstemeyer & Risley

(57) ABSTRACT

An optoelectronic transmission module. In the optoelectronic transmission module, a light transmissive element has first and second ends and top and bottom surfaces, a circuit board transmits electrical signals and has first and second openings. The circuit board is conformably extended from the top surface of the light transmissive element to the bottom surface such that the first and second openings are aligned with the first and second ends respectively. Two light transducers, each having a light transmitter/detector optically aligned with one of the first and second ends of the light transmissive element, wherein the light transducers transmit/receive light signals through the light transmissive element and the light transmitter/detector thereof. Two electrical interconnections are disposed on the circuit board and neighbored with the two ends of the light transmissive element respectively to interconnect the electrical signals.

20 Claims, 4 Drawing Sheets

OPTOELECTRONIC TRANSMISSION MODULE AND FABRICATION METHOD THEREOF

BACKGROUND OF THE INVENTION

1. Field of the Invention

The present invention relates to optoelectronic devices, and more particularly, to an optoelectronic transmission module and fabrication method thereof.

2. Description of the Related Art

Due to the physical characteristics of electrical interconnections, the transmission speed and wideband communication of conventional circuit boards is limited. Thus, a waveguide film and light transducers are combined to form an optoelectronic substrate to meet transmission requirements for high speed data communication. Because light transmission speed is much faster than electrical transmission speed, high transmission speed over a short-distance can be obtained.

In conventional methods, substrates must be etched in order to install a waveguide film or light transducers for transmitting light signals on the same circuit board. It is difficulty, however, to perform optical coupling alignment between the waveguide film and the light transducers because they are disposed in the substrate. Additionally, when the waveguide film or light transducer malfunctions, the substrate must be etched again to replace the defective elements. Moreover, the optical alignment between the waveguide films and the light transducers also must be performed again. Hence, replacing the defective elements is time-consuming. In another conventional method, the waveguide film and the light transducers are not disposed in the substrate prior to optical coupling alignment. This method, however, requires the use of a lens and prism for each transducer. Hence, the optical coupling alignment is still difficult.

SUMMARY OF THE INVENTION

It is therefore an object of the present invention to provide an optoelectronic transmission module capable of transmitting light signals and electrical signals at the same time without requiring a waveguide film or a fiber ribbon to be disposed in a substrate.

Another object of the present invention is to provide an optoelectronic transmission module capable of transmitting light signals and electrical signals at the same time and simple optical coupling between light transducers and a waveguide film or fiber ribbon without requiring a lens and prisms.

According to the above mentioned objects, the present invention provides an optoelectronic transmission module. In the optoelectronic transmission module, a light transmissive element has first and second ends and top and bottom surfaces, a circuit board is disposed on the light transmissive element to transmit electrical signals, and has first and second openings. The circuit board is conformably extended from the top surface of the light transmissive element to the bottom surface of the light transmissive element such that the first and second openings are aligned with the first and second ends respectively. Two light transducers are disposed on the circuit board, each has a light transmitter/detector optically aligned with one of the first or second ends of the light transmissive element, wherein the light transducers transmit/receive light signals through the light transmissive element and the light transmitter/detector thereof.

According to the above mentioned objects, the present invention provides a fabrication method for optoelectronic transmission modules. In the fabrication method, first and second light transducers are disposed on a circuit board with two openings on each side. The first and second light transducers are aligned with the two openings respectively, wherein each of the first and second light transducers has a light transmitter/detector aligned with the corresponding opening of the circuit board. The first and second holders are disposed on a light transmissive element, wherein the light transmissive element has a first holder neighbored with the first opening and a second holder neighbored with the second opening, and each of the first and second holders has a first surface and a second surface. The light transmitter/detector of the first and second light transducers are aligned with the first and second ends of the light transmissive element respectively. The circuit board is fixed on the light transmissive element, wherein the circuit board is conformably extended from the first surface of the first and second holders to the second surface of the first and second holders through the first and second ends of the light transmissive element.

BRIEF DESCRIPTION OF THE DRAWINGS

The present invention can be more fully understood by the subsequent detailed description and examples with reference made to the accompanying drawings, wherein.

DETAILED DESCRIPTION OF THE INVENTION

The present invention provides a fabrication method for an optoelectronic transmissive module, as shown in FIGS. 1a to 1e.

Figure 1A:
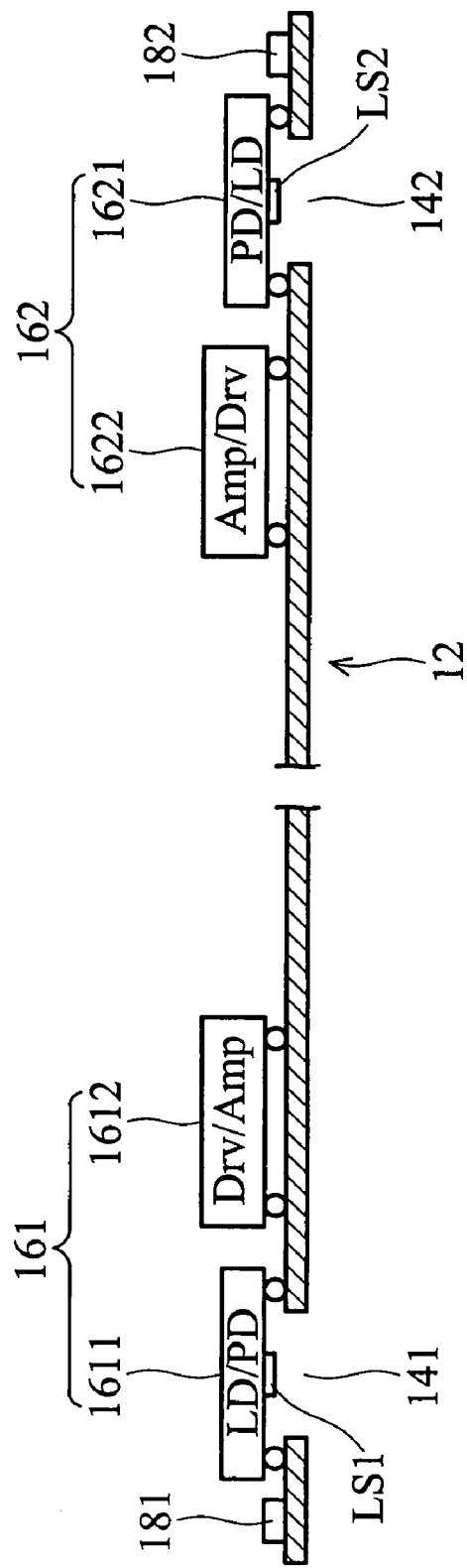
FIGS. 1a~1e are flowchart diagrams of the fabrication method of an optoelectronic module according to the present invention.

As shown in FIG. 1a, a circuit board 12 has two openings 141 and 142 on each side, the circuit board can be a flexible printed circuit board.

Next, first and second light transducers 161 and 162 are disposed on the circuit board 12, and aligned with the openings 141 and 142 of the circuit board 12 respectively. The first light transducer 161 has a light transmitter/detector LS1 aligned with the corresponding opening 141 of the circuit board 12. The second light transducer 162 has a light transmitter/detector LS2 aligned with the corresponding opening 142 of the circuit board 12. For example, the light transmission unit in 1611 of the light transducers 161 and the light detection unit in 1621 of the light transducers 162 constitute a light transmission/reception combination. The light transducer 161 has a light transmission/detection unit 1611 and a driving/amplification unit 1612. The light transducer 162 has a light transmission/detection unit 1621 and a driving/amplification unit 1622. Each light transmission/detection unit 1611 and 1621, has a light transmitter/detector (LS1/LS2) aligned with one of the first or second ends 201 and 202 of the light transmissive element 20 respectively, for transmitting/receiving light signals. The driving/amplification units 1612 and 1622 drive the light transmitters/detectors 1611 and 1621 and amplify the received light signals. Two electrical interconnections 181 and 182 are formed on the circuit board 12, and are neighbored with the openings 141 and 142 respectively.

Figure 1B:
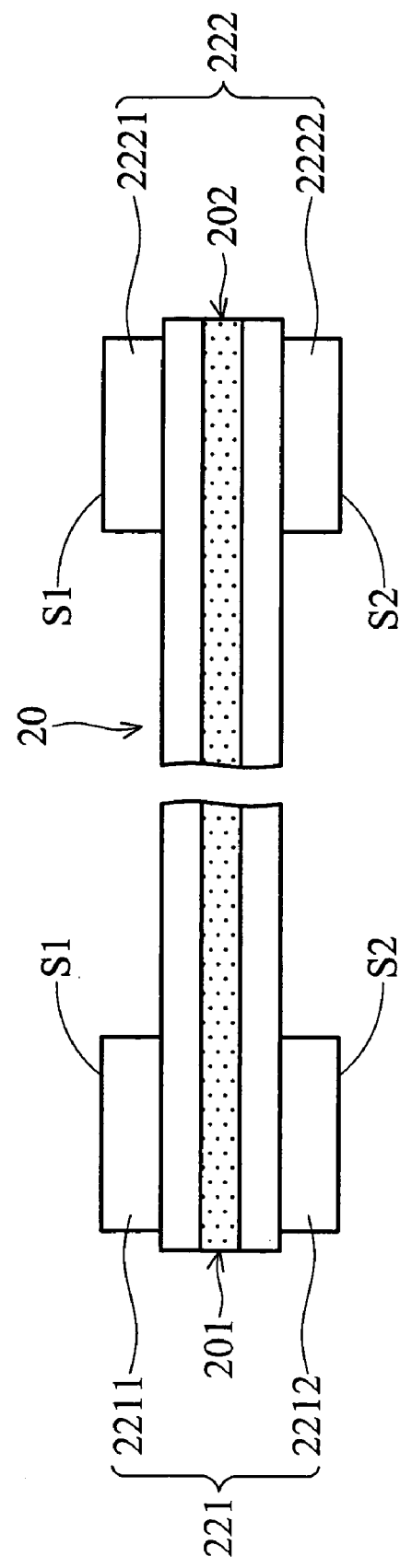

Next, as shown in FIG. 1b, a light transmissive element 20 has a first end 201 and a second end 202. In the present invention, the light transmissive element can be an array waveguide film, an array fiber ribbon or the like. It is to be understood that the invention is not limited to the disclosed embodiments.

A first holder 221 and a second holder 222 are disposed on the light transmissive element 20, the first holder 221 is neighbored with the first end 201 and the second holder 222 is neighbored with the second end 202. Each holder (221 and 222) is composed of a first holding portion (2211 or 2221) and a second holding portion (2212 or 2222), and has a first surface S1 and a second surface S2. The first end 201 of the light transmissive element 20 is switched and fixed by the first holding portion 2211 and the second holding portion 2212. The first end 201 of the light transmissive element 20 is switched and fixed by the first holding portion 2221 and the second holding portion 2222. Additionally, the top surfaces of the first holding portions 2211 and 2221 serve as the first surface S1, while the bottom surfaces of the second holding portions 2212 and 2222 serve as the first surface S2.

Each light transmitter/detector LS1 and LS2 of the light transducer 161 and 162 are aligned with the first end 201 and second end 202 of the light transmissive element 20, and the circuit board 12 is then fixed on the light transmissive board 20.

For example, the light transmitter/detector LS1 of the light transducer 161 is aligned with the first end 201 of the light transmissive element 20 and then fixed by optical index matching and gluing. In the present invention, because the light transmissive element 20 and the light transducers 161 and 162 are not disposed in a substrate, an image camera can be used to check whether or not the light transmissive element 20 is aligned with the light transducers 161. If the light transmissive element 20 is aligned with the light transducers 161, they are then fixed by the optical glue 241, as shown in FIG. 1c. For example, the circuit bard 12 is a flexible printed circuit board, and the optical glue 241 can be thermal-curing epoxy, UV-curing epoxy or the like, it is to be understood that the invention is not limited to the disclosed embodiments.

Figure 1D:
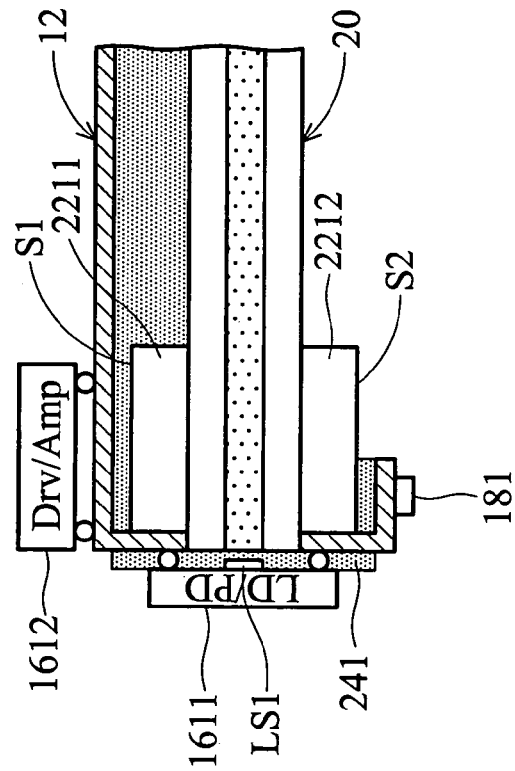
Figure 1C:
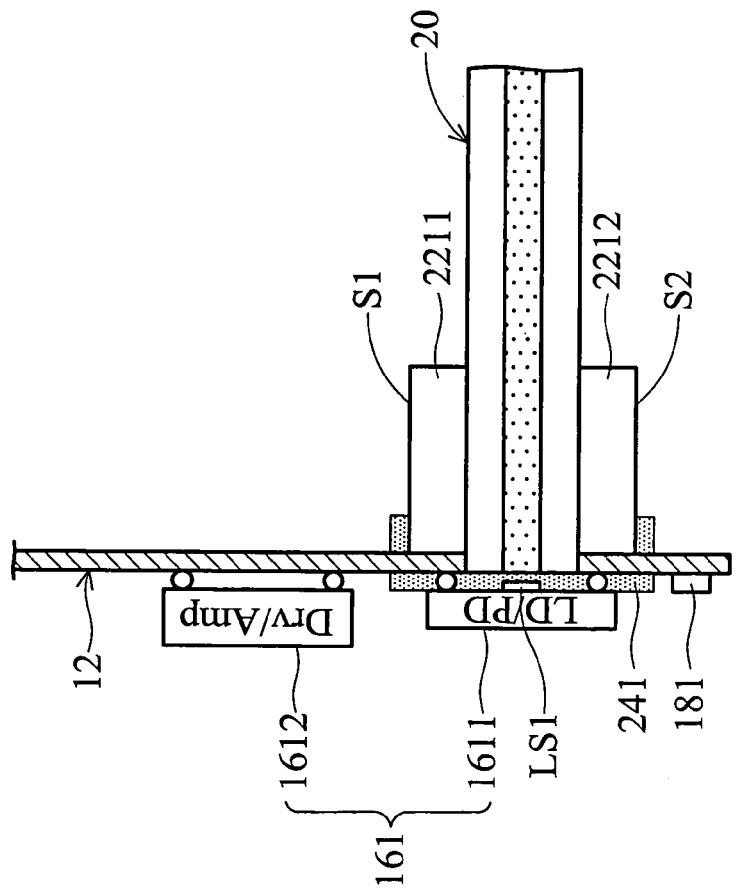

As shown in FIG. 1d, the circuit board 12 is curved such that the circuit board 12 is located on the first surface S1 of the first holding portion 2211 and the electric interconnection 181 is located on the second surface S2 of the second holding portion 2212. Similarly, the light transmitter/detector LS2 of the light transducer 162 is aligned with the second end 202 of the light transmissive element 20 and fixed by optical index matching and gluing. For example, the circuit board 12 and the light transmissive element 20 can also be selectively fixed by glue 242.

Figure 1E:
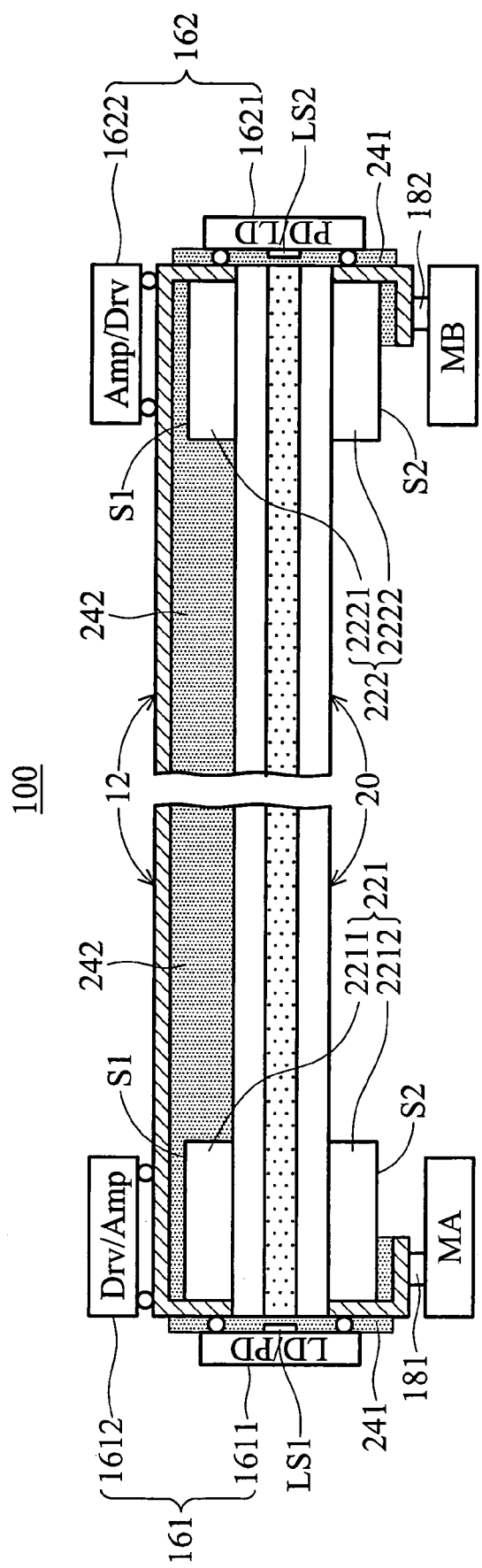

Thus, formation of the optoelectronic transmissive element 100 is complete as shown in FIG. 1e.

The optoelectronic transmission module 100 at least includes a light transmissive element 20, a circuit board 12 two light transducers 161 and 162, and electrical interconnection 181 and 182.

The light transmissive element 20 has a first end 201 and a second end 202 (shown in FIG. 1b), a top surface and a bottom surface. In the present invention, the light transmissive element 20 can be an array waveguide film, an array fiber ribbon or the like, it is to be understood that the invention is not limited to the disclosed embodiments.

The first and second holder 221 and 222 are disposed on the light transmissive element 20. The first holder 221 is neighbored with the first end 201 of the light transmissive element 20, and the second holder 222 is neighbored with the second end 202 of the light transmissive element 20. Both the first holder 221 and the second holder 222, have a first surface S1 and a second surface S2, and each is composed of a first holding portion (2211 or 2221) and a second holding portion (2212 or 2222). The first end 201 of the light transmissive element 12 is switched and fixed by the first holding portion 2211 and the second holding portion 2212. The first end 201 of the light transmissive element 12 is switched and fixed by the first holding portion 2221 and the second holding portion 2222. The first holding portion 2211 and 2221 are disposed between the top surface of the light transmissive element 20 and the circuit board 12, and the second holding portion 2212 and 2222 are disposed between the bottom surface of the light transmissive element 20 and the circuit board 12. In addition, the top surfaces of the first holding portions 2211 and 2221 serve as the first surface S1, the bottom surfaces of the second holding portions 2212 and 2222 serve as the first surface S2.

The circuit board 12 is disposed on the light transmissive element 20 to transmit electrical signals, and includes a first opening 141 and a second opening 142 as shown in FIG. 1a. The circuit board 12 is conformably extended from the top surface to the bottom surface of the light transmissive element 20 through the first and second ends 201 and 202, such that the first and second openings 141 and 142 are aligned with the first and second ends 201 and 202 respectively.

In this embodiment of the present invention, the circuit board 12 is a flexible printed circuit board, and thus, the circuit board 12 can be conformably extended from the top surface Si of the first holding portions 2211 and 2221 to the bottom surface S2 of the second holding portions 2212 and 2222 through the first and second ends 201 and 202 of the light transmissive element 20, such that the first and second openings 141 and 142 are aligned with the first and second ends 201 and 202 respectively.

The light transducers 161 and 162 are disposed on the circuit board 12 to transmit/receive light signals through the light transmissive element 20. The light transducer 161 has a light transmission/detection unit 1611 and a driving/amplification unit 1612. The light transducer 162 has a light transmission/detection unit 1612 and a driving/amplification unit 1622. The light transmission/detection units 1611 and 1621, each have a light transmitter/detector (LS1/LS2) aligned with one of the first and second ends 201 and 202 of the light transmissive element 20 respectively, for transmitting/receiving light signals. The driving/amplification units 1612 and 1622 drive the light transmitters/detectors 1611 and 1621 and amplify the received light signals. In this embodiment of the present invention, the light transducers 161 and 162 are fixed on the light transmissive element 20 by an optical glue 241, such that each light transmitter/detector LS1 and LS2 of light transducers 161 and 162 are aligned with the first and second ends 201 and 202 of the light transmissive element 20 respectively. The optical glue 241 can be, for example, a thermal-curing epoxy, an UV-curing epoxy or the like, it is to be understood that the invention is not limited to the disclosed embodiments.

The optoelectronic transmission module 100 further includes two electrical interconnections 181 and 182 neighbored with the second holding portions 2212 and 2222 to electrically couple to external circuits. For example, the electrical interconnections 181 and 182 can be pads, plug connections or the like. Thus, the optoelectronic transmission module 100 can be disposed on the pads between the external circuits, electrical elements or subsystems as a connector and transmitter for light and electrical signals.

Therefore, the optoelectronic transmission module 100 can transmit light signals and electrical signals at the same time between two sub-modules, such as the modules MA and MB, without requiring a waveguide film or a fiber wiring to be embedded inside a substrate interconnecting modules MA and MB. Moreover, the transmission module 100 obtains optical coupling between light transducers and a waveguide film or fiber ribbon without requiring a lens and prisms. Moreover, when the waveguide film, fiber ribbon or the light transducers in the optoelectronic transmission module malfunction, the defective module can be simply replaced without requiring the complicated time-consuming process of the conventional method.

Figure 2:
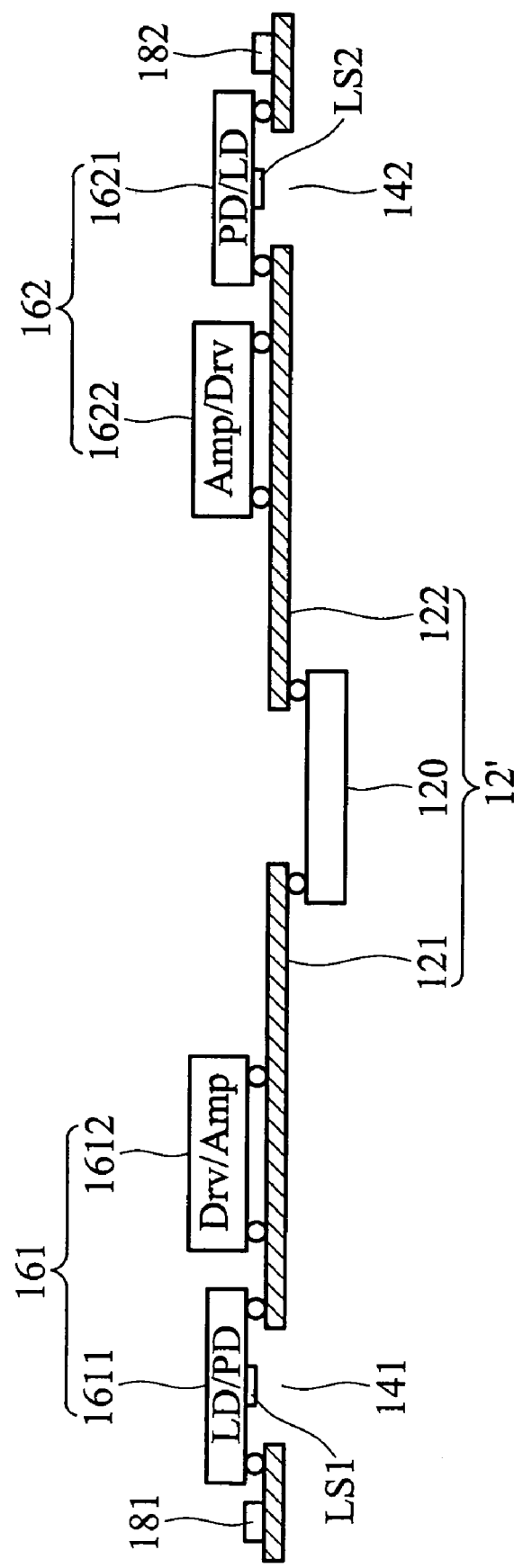
FIG. 2 is a diagram of a circuit board in the optoelectronic module according to the present invention.

FIG. 2 is a diagram of another embodiment of the optoelectronic transmission module according to the present invention. As shown in FIG. 2, the circuit board 12' at least includes a printed circuit board 120 and two flexible portions 121 and 122, it is to be understood that the invention is not limited to the disclosed embodiments. In this embodiment, the flexible portions 121 and 122 can be two flexible printed circuit boards, and the openings 141 and 142 are located on the flexible portions 121 and 122 respectively. Because the circuit board 12' has the two flexible potions 121 and 122, the circuit board 12' can be curved and conformably extended from the first surface S1 of the first holding portion 2211 and 2221 to the second surface S2 of the second holding portion 2212 and 2222 through the first and second ends 201 and 202 of the light transmissive element 20. Therefore, the two light transducers 161 and 162 can transmit/receive light signals through the light transmissive element 20 and the circuit board 12' can transmit electrical signals directly or, process electrical signals via active/passive elements disposed on the circuit board 12'.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optoelectronic transmission module, comprising:
   a light transmissive element having a first end, a second end, a top surface and a bottom surface;
   a circuit board disposed on the top surface of the light transmissive element to transmit electrical signals, and having a first opening and a second opening, wherein the circuit board is conformably extended to the bottom surface of the light transmissive element through the first opening and the second opening such that the first and second openings are aligned with the first and second ends of the light transmissive element respectively; and
   two light transducers disposed on the circuit board, each having a light transmitter/detector optically aligned with one of the first and second ends of the light transmissive element respectively, wherein the light transducers transmit/receive light signals through the light transmissive element and the light transmitter/detector thereof.

2. The optoelectronic transmission module as claimed in claim 1, wherein the circuit board is a flexible printed circuit board.

3. The optoelectronic transmission module as claimed in claim 1, wherein the circuit board comprises at least a printed circuit board, a first flexible portion and a second flexible portion, and the first opening and the second opening are in the first and second flexible portions respectively.

4. The optoelectronic transmission module as claimed in claim 1, further comprising a first holder and a second holder disposed on the light transmissive element, wherein the first holder is neighbored with the first end, the second holder is neighbored with the second end, and each of the first and second holders has a first holding portion and a second holding portion to fix the light transmissive element, the first holding portion is disposed between the top surface of the light transmissive element and the circuit board, and the second holding portion is disposed between the bottom surface of the light transmissive element and the circuit board.

5. The optoelectronic transmission module as claimed in claim 1, further comprising first and second electrical interconnections disposed on the circuit board and neighbored with the first and second ends of the light transmissive element respectively to interconnect the electrical signals.

6. The optoelectronic transmission module as claimed in claim 1, wherein each light transducer comprises:
   a light transmission unit/detection unit disposed on the circuit board, having the light transmitter/detector optically aligned with one of the first or second ends of the light transmissive element to transmit/receive the light signals; and
   a driving/amplification unit disposed on the circuit board to drive the light transmitter/detector to transmit the light signals or to amplify the light signals received by the light transmitter/detector.

7. The optoelectronic transmission module as claimed in claim 1, wherein the light transmissive element is an array waveguide film.

8. The optoelectronic transmission module as claimed in claim 1, wherein the light transmissive element is an array fiber ribbon.

9. The optoelectronic transmission module as claimed in claim 1, wherein the circuit board is fixed on the light transmissive element by optical index matching and gluing such that the light transmitter/detector of each light transducer is aligned with the first and second ends of the light transmissive element.

10. The optoelectronic transmission module as claimed in claim 5, wherein first and second electrical interconnections are pads or plug connections.

11. A fabrication method for optoelectronic transmission modules, comprising:
   providing a circuit board, wherein the circuit board has two openings on each side;
   disposing first and second light transducers on the circuit board to align with the two openings respectively, wherein each of the first and second light transducers has a light transmitter/detector aligned with the corresponding opening of the circuit board;
   disposing first and second holders on a light transmissive element, wherein the light transmissive element has a first holder neighbored with the first opening and a second holder neighbored with the second opening, and each of the first and second holders has a first surface and a second surface;
   aligning the light transmitter/detector of the first and second light transducers with the first and second ends of the light transmissive element respectively; and
   fixing the circuit board on the light transmissive element, wherein the circuit board is conformably extended from the first surface of the first and second holders to the second surface of the first and second holders through the first and second ends of the light transmissive element.

12. The fabrication method as claimed in claim 11, wherein the first and second holder each comprise a first holding portion and a second holding portion for fixing the light transmissive element, and the first holding portion has a top surface as the first surface and the second holding portion has a bottom surface as the second surface.

13. The fabrication method as claimed in claim 12, wherein fixing the circuit board on the light transmissive element comprises the steps of:
   aligning the first light transmitter/detector of the light transducer and the first end of the light transmissive element;
   fixing the first light transmitter/detector of the light transducer and the first end of the light transmissive element by an optical index matching and gluing procedure;
   curving the circuit board such that the circuit board is disposed on the first surfaces of the first and second holder;
   aligning the second light transmitter/detector of the light transducer and the second end of the light transmissive element; and
   fixing the second light transmitter/detector of the light transducer and the second end of the light transmissive element by another optical index matching and gluing procedure.

14. The fabrication method as claimed in claim 13, wherein the step of disposing a first and second light transducers on the circuit board comprises a step of forming two electrical interconnections on the circuit board, wherein the two electrical interconnections are neighbored with the corresponding opening of the circuit board respectively.

15. The fabrication method as claimed in claim 14, further comprising a step of curving the circuit board such that the two electrical interconnections are disposed on the second surfaces of the first and second holder respectively.

16. The fabrication method as claimed in claim 15, wherein the circuit board is a flexible printed circuit board.

17. The fabrication method as claimed in claim 15, wherein the circuit board is a printed circuit board with a first flexible portion and a second flexible portion, the first and second openings are in the first and second flexible portions respectively.

18. The fabrication method as claimed in claim 15, wherein the first and second light transducers, each comprise:
   a light transmission unit/detection unit disposed on the circuit board, having the transmitter/detector optically aligned with one of the first and second ends of the light transmissive element to transmit/receive the light signals; and
   a driving/amplification unit disposed on the circuit board to drive the light transmitter/detector to transmit the light signals or to amplify the light signals received by the light transmitter/detector.

19. The fabrication method as claimed in claim 15, wherein the light transmissive element is an array waveguide film.

20. The fabrication method as claimed in claim 15, wherein the transmissive element is an array fiber ribbon.

* * * * *